US011725295B2

(12) United States Patent
Takeuchi et al.

(10) Patent No.: US 11,725,295 B2
(45) Date of Patent: Aug. 15, 2023

(54) HEAT RECOVERY DEVICE AND ELECTRODEPOSITION COATING SYSTEM

(71) Applicant: TRINITY INDUSTRIAL CORPORATION, Toyota (JP)

(72) Inventors: Yosuke Takeuchi, Toyota (JP); Koichi Tanaka, Miyoshi (JP)

(73) Assignee: TRINITY INDUSTRIAL CORPORATION, Toyota (JP)

( * ) Notice: Subject to any disclaimer, the term of this patent is extended or adjusted under 35 U.S.C. 154(b) by 265 days.

(21) Appl. No.: 17/254,185

(22) PCT Filed: Jun. 4, 2019

(86) PCT No.: PCT/JP2019/022081
§ 371 (c)(1),
(2) Date: Dec. 18, 2020

(87) PCT Pub. No.: WO2020/026585
PCT Pub. Date: Feb. 6, 2020

(65) Prior Publication Data
US 2021/0269934 A1    Sep. 2, 2021

(30) Foreign Application Priority Data

Aug. 2, 2018 (JP) .................................. 2018-145614

(51) Int. Cl.
*C25D 13/22* (2006.01)
*C25D 13/20* (2006.01)
(52) U.S. Cl.
CPC ............. *C25D 13/22* (2013.01); *C25D 13/20* (2013.01)
(58) Field of Classification Search
None
See application file for complete search history.

(56) References Cited

U.S. PATENT DOCUMENTS

2015/0047351 A1* 2/2015 Ishikawa .................. F02G 5/02
60/624
2018/0202064 A1 7/2018 Katayama et al.

FOREIGN PATENT DOCUMENTS

CN     201609692 U    10/2010
CN     103648660 A     3/2014
(Continued)

OTHER PUBLICATIONS

Aug. 23, 2021 Office Action issued in Chinese Patent Application No. 201980040899.0.
(Continued)

*Primary Examiner* — Louis J Rufo
(74) *Attorney, Agent, or Firm* — Oliff PLC

(57) ABSTRACT

A heat recovery device including: a warm-water bath storing warm water and a drying chamber, wherein warm exhausted air from the chamber heats the water includes: an exhaust duct that the exhausted air from the chamber to the outside air passes; an exhaust bypass duct between two positions in the exhaust duct; a circulation pipe through which the water circulates; a heat exchanger provided generates air in the bypass duct to be absorbed by water in the circulation pipe; a warm-water bypass pipe between two positions downstream to the heat exchanger in the circulation pipe or between one position downstream to the heat exchanger in the circulation pipe and the warm-water bath; a heatsink provided at the bypass pipe; a first distribution-changing valve for distribution of air flowing from the exhaust duct to the exhaust bypass duct; and a second distribution valve for distributing water to the bypass pipe.

8 Claims, 4 Drawing Sheets

(56) References Cited

FOREIGN PATENT DOCUMENTS

| | | | |
|---|---|---|---|
| CN | 108026658 | A | 5/2018 |
| JP | S56119430 | A | 9/1981 |
| JP | S58-136800 | A | 8/1983 |
| JP | H04396 | A | 1/1992 |
| JP | 2006-183128 | A | 7/2006 |
| JP | 2009-167496 | A | 7/2009 |
| JP | 2011-058081 | A | 3/2011 |
| JP | 2011-153342 | A | 8/2011 |
| JP | 5830563 | B2 | 12/2015 |

OTHER PUBLICATIONS

Aug. 27, 2019 International Search Report issued in International Patent Application No. PCT/JP2019/022081.
Mar. 14, 2022 Office Action issued in Chinese Patent Application No. 201980040899.0.

* cited by examiner

HEAT RECOVERY DEVICE AND ELECTRODEPOSITION COATING SYSTEM

TECHNICAL FIELD

The present disclosure relates to a heat recovery device that exploits waste heat generated in factory facilities and an electrodeposition coating system including the heat recovery device.

BACKGROUND ART

Conventionally, what is known as a heat recovery device of this type is a heat recovery device that exploits heat of air exhausted from a drying chamber (for example, see Patent Literature 1).

CITATIONS LIST

Patent Literature

Patent Literature 1: Japanese Patent No. 5830563 (paragraph [0076])

SUMMARY OF INVENTION

Technical Problems

The conventional heat recovery device suffers difficulty in minutely adjusting the amount of waste-heat-exploited heat applied to a heating target. This problem is desired to be solved.

Solutions to Problems

A heat recovery device according to one aspect of the present invention for solving the problem is a heat recovery device adapted to a facility including: a warm-water bath storing warm water heated by a first heater; and a drying chamber having its inside heated by a second heater, wherein heat of air exhausted from the drying chamber to outside air heats the warm water in the warm-water bath, the heat recovery device including: an exhaust duct through which the air exhausted from the drying chamber to the outside air passes; an exhaust bypass duct communicating between two positions in the exhaust duct; a warm-water circulation pipe through which the warm water of the warm-water bath circulates; a heat exchanger provided at a midway portion of the warm-water circulation pipe so as to cause heat of the air in the exhaust bypass duct to be absorbed by the warm water in the warm-water circulation pipe; a warm-water bypass pipe communicating between two positions downstream to the heat exchanger in the warm-water circulation pipe or between one position downstream to the heat exchanger in the warm-water circulation pipe and the warm-water bath; a heatsink provided at the warm-water bypass pipe; a first distribution-changing valve configured to change distribution of air flowing from the exhaust duct to the exhaust bypass duct; and a second distribution-changing valve configured to change distribution of water flowing from the warm-water circulation pipe to the warm-water bypass pipe.

DESCRIPTION OF EMBODIMENT

First Embodiment

Figure 1:
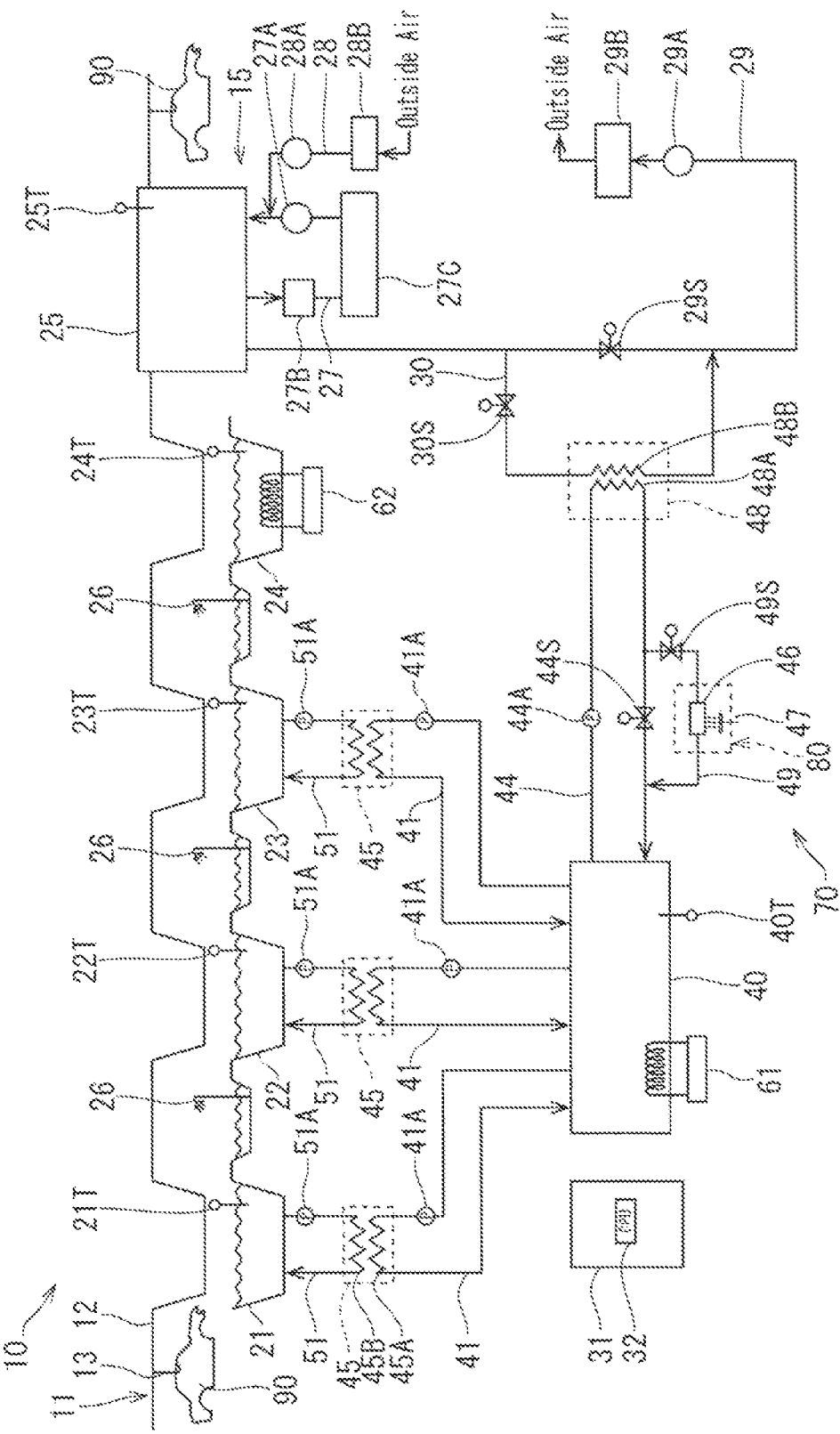
FIG. 1 is a schematic diagram of an electrodeposition coating system according to a first embodiment.

In the following, a description will be given of a first embodiment of an electrodeposition coating system 10 in FIGS. 1 to 4. In a workpiece conveying device 11 of the electrodeposition coating system 10, a plurality of carrier hangers 13 arranged at a certain interval shift along a rail 12. The rail 12 is annular, and an electrodeposition coating line 15 is provided along part of the rail 12. Components such as automobile bodies or doors are conveyed as being hung as workpieces 90 from the carrier hangers 13.

In order to successively carry out a degreasing process, a cleaning process, a chemical treatment process, an electrodeposition process, and a baking process which are known in the electrodeposition technique, the electrodeposition coating line 15 includes a degreasing bath 21, a cleaning bath 22, a chemical treatment bath 23, an electrodeposition bath 24, and a drying chamber 25. Note that, the degreasing bath 21, the cleaning bath 22, and the chemical treatment bath 23 correspond to "a plurality of liquid baths" recited in claims. Furthermore, when the degreasing bath 21, the cleaning bath 22, the chemical treatment bath 23, and the electrodeposition bath 24 are not distinguished from one another, they are simply referred to as "baths 21, 22, 23, 24", for example.

While being conveyed by the workpiece conveying device 11, the workpieces 90 pass through liquids in the baths 21, 22, 23, 24 as being immersed, whereby the degreasing process, the cleaning process, the chemical treatment process, and the electrodeposition process are performed on the workpiece 90. As the workpieces 90 pass through the drying chamber 25, baking of a coating film is carried out. To this end, the baths 21, 22, 23, 24 each store a liquid of, for example, 40 to 80 [kiloliters]. The electrodeposition bath 24 is provided with not-illustrated electrodes inside and at its upper part. Between the pair of electrodes, voltage is applied. When each workpiece 90 is immersed in the electrodeposition bath 24, the carrier hanger 13 is brought into the upper one of the electrodes of the electrodeposition bath 24. Note that, at each location between the bathes, a shower facility 26 for washing out the liquids of the baths is provided.

Furthermore, the temperature of the liquid in the electrodeposition bath 24 is set to, for example, about 30° C. The temperature of the liquids in the degreasing bath 21, the cleaning bath 22, and the chemical treatment bath 23 is set to, for example, about 40° C. The temperature of air in the drying chamber 25 is set to 200° C. In order to maintain the liquids in the baths 21, 22, 23, 24 and the air in the drying chamber 25 at the above set temperatures, the electrodeposition coating system 10 includes the following structure.

To the drying chamber 25, a heating-purpose circulation duct 27 is connected. The heating-purpose circulation duct 27 communicates between two positions in the drying chamber 25. On this communication route, a filter 27B, a heater 27C (corresponding to "a second heater" recited in claims), and a blower 27A are disposed. The blower 27A feeds air inside the drying chamber 25 to the heater 27C via the filter 27B, which air is heated and returned to the drying chamber 25. A control unit 31 of the electrodeposition coating system 10 changes the output of the heater 27C according to the deviation between the detection result from a temperature sensor 25T provided at the drying chamber 25 and the set temperature (200° C.), thus exerting feedback control so that the air in the drying chamber 25 attains the set temperature.

In the heating-purpose circulation duct 27, in the vicinity of a warm-air exhaust port to the drying chamber 25, an intake duct 28 is connected. In the drying chamber 25, at a position far from the warm-air exhaust port of the heating-purpose circulation duct 27, an exhaust duct 29 is connected. The intake duct 28 is provided with a blower 28A and a filter 28B. The exhaust duct 29 is provided with a fan 29A and a VOC removing device 29B. The outside air is drawn through the intake duct 28, and part of the air inside the drying chamber 25 is exhausted to the outside air through the exhaust duct 29 with the VOC component being removed. Thus, part of the air in the drying chamber 25 is replaced by fresh air, whereby an increase in the VOC concentration in the drying chamber 25 is suppressed.

The electrodeposition bath 24 is provided with, for example, a heat pump 62, and capable of heating and cooling the liquid inside. The control unit 31 changes the output of the heat pump 62 according to the deviation between the detection result from a temperature sensor 24T provided at the electrodeposition bath 24 and the set temperature (30° C.), thus exerting feedback control so that the liquid in the electrodeposition bath 24 attains the set temperature.

The liquids in the degreasing bath 21, the cleaning bath 22, and the chemical treatment bath 23 are heated by warm water in a warm-water bath 40 shared by the baths 21, 22, 23. Specifically, the warm-water bath 40 stores warm water of, for example, 10 to 50 [kiloliters]. The temperature of the warm water is set to be higher than the temperatures of the liquids in the degreasing bath 21, the cleaning bath 22, and the chemical treatment bath 23, for example, to be 70° C.

To the warm-water bath 40, three warm-water circulation pipes 41 are connected for heating the degreasing bath 21, the cleaning bath 22, and the chemical treatment bath 23. The warm-water circulation pipes 41 are each provided with a pump 41A on their courses, to draw in the warm water in the warm-water bath 40 and return the warm water to the warm-water bath 40 (that is, to circulate the warm water of the warm-water bath 40).

On the other hand, the degreasing bath 21, the cleaning bath 22, and the chemical treatment bath 23 are respectively provided with liquid circulation pipes 51 for absorbing heat, which are each provided with a pump 51A on their courses similarly to the warm-water circulation pipes 41. The midway portions of the liquid circulation pipes 51 of the degreasing bath 21, the cleaning bath 22, and the chemical treatment bath 23 and the midway portions of the warm-water circulation pipes 41 are connected to shared heat exchangers 45.

In each heat exchanger 45, a channel 45A through which warm water of the corresponding warm-water circulation pipe 41 passes and a channel 45B through which the liquid of the corresponding liquid circulation pipe 51 passes are juxtaposed to each other while separated from each other. Thus, heat is exchanged between the liquids in the liquid circulation pipes 51 and the warm water in the warm-water circulation pipes 41, whereby the liquids in the degreasing bath 21, the cleaning bath 22, and the chemical treatment bath 23 are heated by the warm water in the warm-water bath 40.

The degreasing bath 21, the cleaning bath 22, and the chemical treatment bath 23 are respectively provided with temperature sensors 21T, 22T, 23T. According to the detection result from the temperature sensors 21T, 22T, 23T, the control unit 31 exerts ON/OFF control on the pumps 41A, 51A so that the liquids in the degreasing bath 21, the cleaning bath 22, and the chemical treatment bath 23 attain 40° C. Specifically, when the liquid in the degreasing bath 21 is less than 40° C., the control unit 31 exerts the ON/OFF control of turning on the pumps 41A, 51A for the degreasing bath 21; when it is 40° C. or more, the control unit 31 exerts the ON/OFF control of turning off the pumps 41A, 51A. The control unit 31 exerts the ON/OFF control on the pumps 41A, 51A similarly as to the cleaning bath 22 and the chemical treatment bath 23.

The warm-water bath 40 is also provided with a temperature sensor 40T. The warm water in the warm-water bath 40 is heated by the heat pump 61 (corresponding to "a first heater" in claims) and a heat recovery device 70 that exploits heat of the air exhausted from the drying chamber 25. The heat recovery device 70 is provided with a heat-absorption-purpose warm-water circulation pipe 44 through which the warm water of the warm-water bath 40 circulates and an exhaust bypass duct 30 through which the air from the drying chamber 25 passes. Similarly to the heating-purpose warm-water circulation pipes 41, the heat-absorption-purpose warm-water circulation pipe 44 is provided with a pump 44A on its course. On the other hand, the exhaust bypass duct 30 connects between two positions in the exhaust duct 29. The midway portion of the exhaust bypass duct 30 and that of the warm-water circulation pipe 44 are connected to a shared heat exchanger 48. In the heat exchanger 48, a channel 48A through which the warm water of the warm-water circulation pipe 44 passes and a channel 48B through which the air of the exhaust bypass duct 30 passes are juxtaposed to each other while separated from each other. Thus, heat is exchanged between the warm water in the warm-water circulation pipe 44 and the air in the exhaust bypass duct 30, whereby the warm water in the warm-water bath 40 is heated by the waste heat from the drying chamber 25.

The heat recovery device 70 is provided with a warm-water bypass pipe 49 communicating between two positions in the warm-water circulation pipe 44 downstream to the heat exchanger 48. A heatsink 46 is provided on a course of the warm-water bypass pipe 49, and a cooling fan 47 is disposed to oppose to the heatsink 46.

Figure 4:
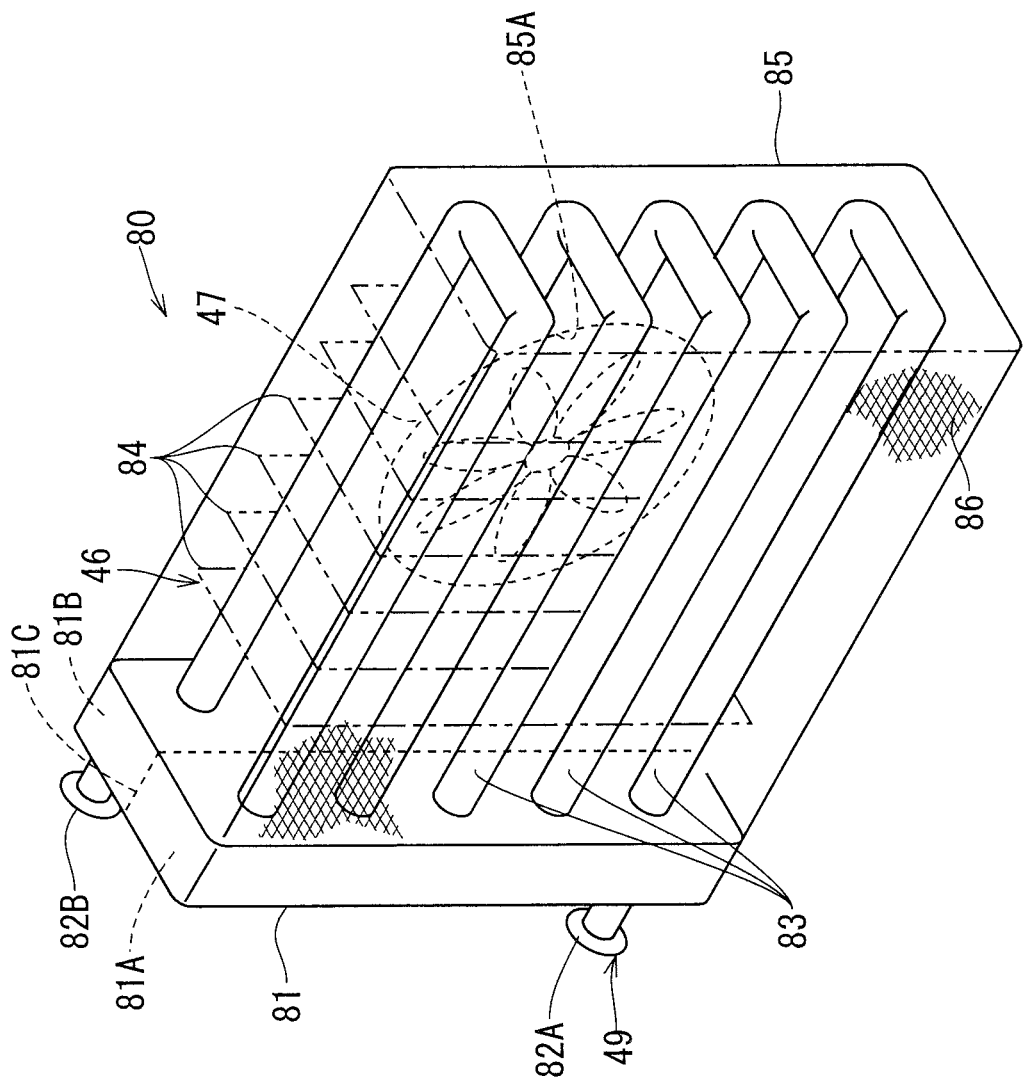
FIG. 4 is a perspective view of a cooling device.

Specifically, part of the warm-water bypass pipe 49 includes a relay pipe 83 of an air-cooling device 80 and other components in FIG. 4. The air-cooling device 80 includes a box-shaped case 85 whose entire front side is open. At the rear surface of the box-shaped case 85, a circular window 85A is formed and the cooling fan 47 is mounted on the circular window 85A so as to rotate inside. The rotating cooling fan 47 draws air from the entire front side of the box-shaped case 85 and exhausts the air from the circular window 85A. Note that, the entire front side of the box-shaped case 85 is covered with a filter 86.

At one side surface of the box-shaped case 85, a relay tank 81 is provided. The relay tank 81 has a vertically elongated rectangular parallelepiped shape which overlaps with the entire one side surface of the box-shaped case 85. The inside of the relay tank 81 is divided into a front relay chamber 81A and a rear relay chamber 81B by a partition wall 81C. For example, a plurality of relay pipes 83 each bent in a U-shaped manner within a horizontal plane are vertically juxtaposed in the box-shaped case 85 having their one ends and other ends connected to the front relay chamber 81A and the rear relay chamber 81B. From the front relay chamber 81A and the rear relay chamber 81B, connection pipes 82A, 82B respectively extend and are connected to two positions in the warm-water circulation pipe 44. The connection pipes 82A, 82B, the relay tank 81, and the plurality of relay pipes 83 form the warm-water bypass pipe 49. In the box-shaped case 85, a plurality of aluminum plates 84 are arranged as being spaced apart from one another and mounted so as to abut on the plurality of relay pipes 83. Thus, the heatsink 46 is formed.

As illustrated in FIG. 1, the exhaust duct 29, the exhaust bypass duct 30, the warm-water circulation pipe 44, and the warm-water bypass pipe 49 are respectively provided with valves 29S, 30S, 44S, 49S. The valve 29S of the exhaust duct 29 is disposed, in the exhaust duct 29, between two positions where the exhaust bypass duct 30 is connected. Similarly, the valve 44S of the warm-water circulation pipe 44 is disposed, in the warm-water circulation pipe 44, between two positions where the warm-water bypass pipe 49 is connected. The valve 30S of the exhaust bypass duct 30 is disposed upstream to the heat exchanger 48, and the valve 49S of the warm-water bypass pipe 49 is disposed upstream to the heatsink 46. The flow rate of the valves 29S, 30S, 44S, 49S can be adjusted by manually changing the valve opening, for example.

The control unit 31 of the electrodeposition coating system 10 also functions as "the control unit" for the heat recovery device 70. When the electrodeposition coating system 10 is actuated, a CPU 32 in the control unit 31 executes an actuation control program PG1 in FIG. 2 and a switching control program PG2 in FIG. 3 repeatedly by a predetermined cycle. Upon actuation, the CPU 32 resets flags FLG1 to FLG3, which will be described later, to "0". (Note that, the flags FLG1 to FLG3 are simply referred to as "FLG1 to FLG3" or the like.

Figure 2:
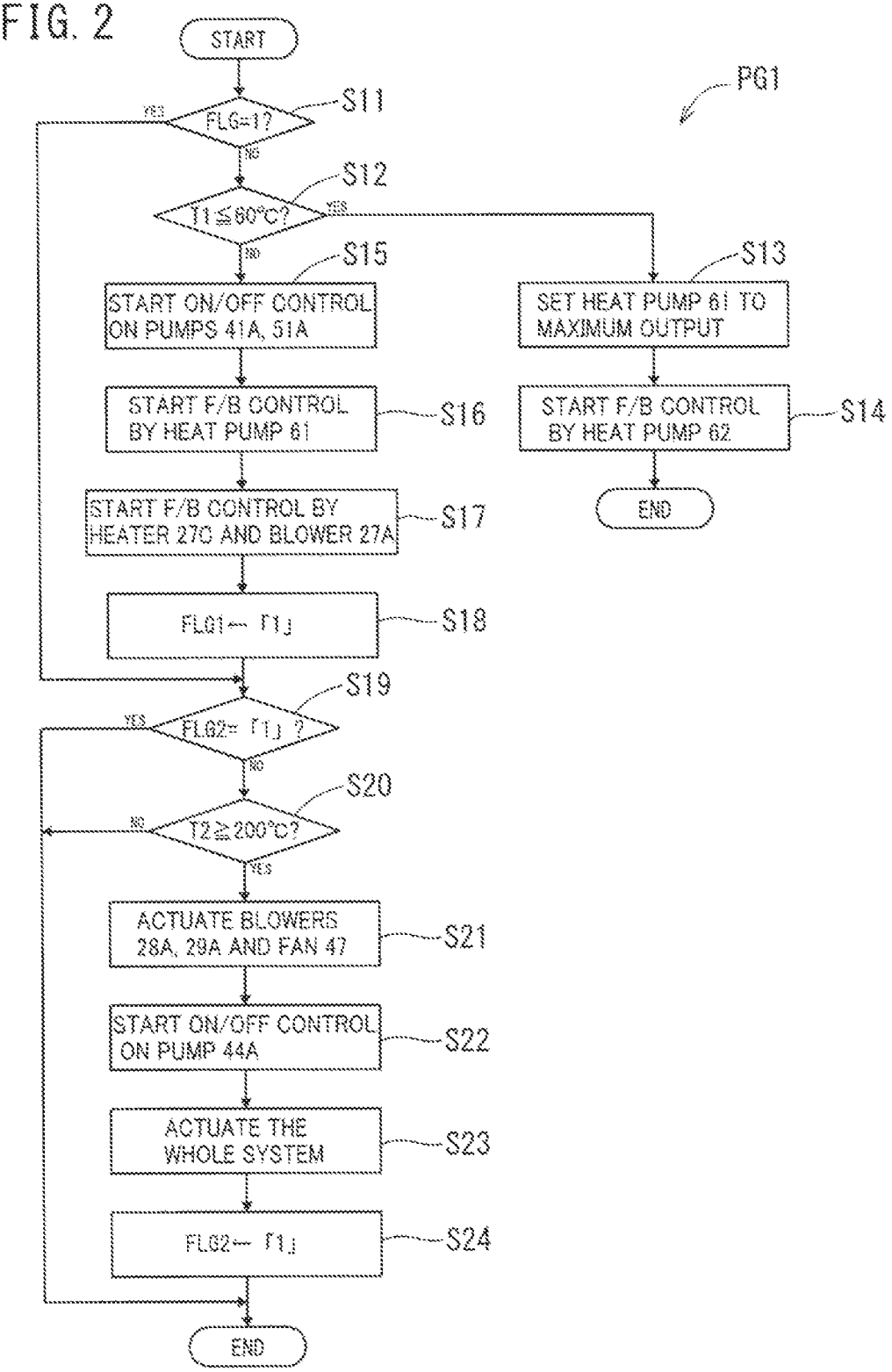
FIG. 2 is a flowchart of an actuation control program.

As indicated in FIG. 2, when the actuation control program PG1 is executed, whether or not FLG1 is "1" is determined (S11). When FLG1 is not "1" (NO in S11), a determination is made as to whether or not a temperature T1 of the warm water in the warm-water bath 40 detected by the temperature sensor 40T (hereinafter simply referred to as "the warm-water temperature T1") is equal to or lower than, for example, 60° C. as the reference temperature which is lower than the set temperature of 70° C. (S12). Here, when the warm-water temperature T1 is 60° C. or less (YES in S12), the heat pump 61 of the warm-water bath 40 is started to drive at the maximum power (S13); and the feedback control by the heat pump 62 is started so that the liquid in the electrodeposition bath 24 attains the set temperature (30° C.) (S14). Then, control exits the actuation control program PG1.

On the other hand, when the warm-water temperature T1 exceeds 60° C. (NO in S12), the ON/OFF control on the pumps 41A, 51A is started so that the liquids in the degreasing bath 21, the cleaning bath 22, and the chemical treatment bath 23 attain the set temperature of 40° C. (S15).

Next, the heat pump 61 of the warm-water bath 40 is switched from the maximum-power drive to feedback control according to the deviation between the warm-water temperature T1 and the set temperature (70° C.) (S16). Next, the feedback control is started, in which the output of the heater 27C and the blower 27A of the drying chamber 25 is changed according to the deviation between the temperature of the air in the drying chamber 25 and the set temperature (200° C.) (S17). Then, "1" is set on FLG1 (S18).

Next, whether or not FLG2 is "1" is determined (S19). Furthermore, when the FLG1 is "1" in the foregoing determination process on FLG1 (S11) (YES in S11), this determination process on FLG2 is immediately performed (S19).

When FLG2 is "1" (YES in S19), control immediately exits the actuation control program PG1. On the other hand, when FLG2 is not "1" (NO in S19), whether a temperature T2 of the air in the drying chamber 25 detected by the temperature sensor 25T (hereinafter simply referred to as "the air temperature T2") is 200° C. or more is determined (S20). When the air temperature T2 is less than 200° C. (NO in S20), control exits the actuation control program PG1.

On the other hand, when the air temperature T2 is 200° C. or more (YES in S20), the blowers 28 A and the fan 29A of the intake duct 28 and the exhaust duct 29 and the cooling fan 47 are actuated (S21). Next, the ON/OFF control is started on the pump 44A of the heat-absorption-purpose warm-water circulation pipe 44 (S22). Specifically, the ON/OFF control is started so that the pump 44A is turned on when the warm water in the warm-water bath 40 is less than 70° C. and so that the pump 44A is turned off when the warm water in the warm-water bath 40 is 70° C. or more.

Then, the workpiece conveying device 11 is actuated (S23); the whole electrodeposition coating system 10 is actuated and "1" is set on FLG2 (S24); and control exits the actuation control program PG1. Note that, application of voltage to a pair of electrodes in the electrodeposition bath 24 is started when the workpiece 90 arrives at the electrodeposition bath 24.

The actuation control program PG1 actuates the sites of the electrodeposition coating system 10 in descending order of the length of time required to actuate. This eliminates the wasteful latency that would occur when all the sites of the electrodeposition coating system 10 are actuated at once.

Figure 3:
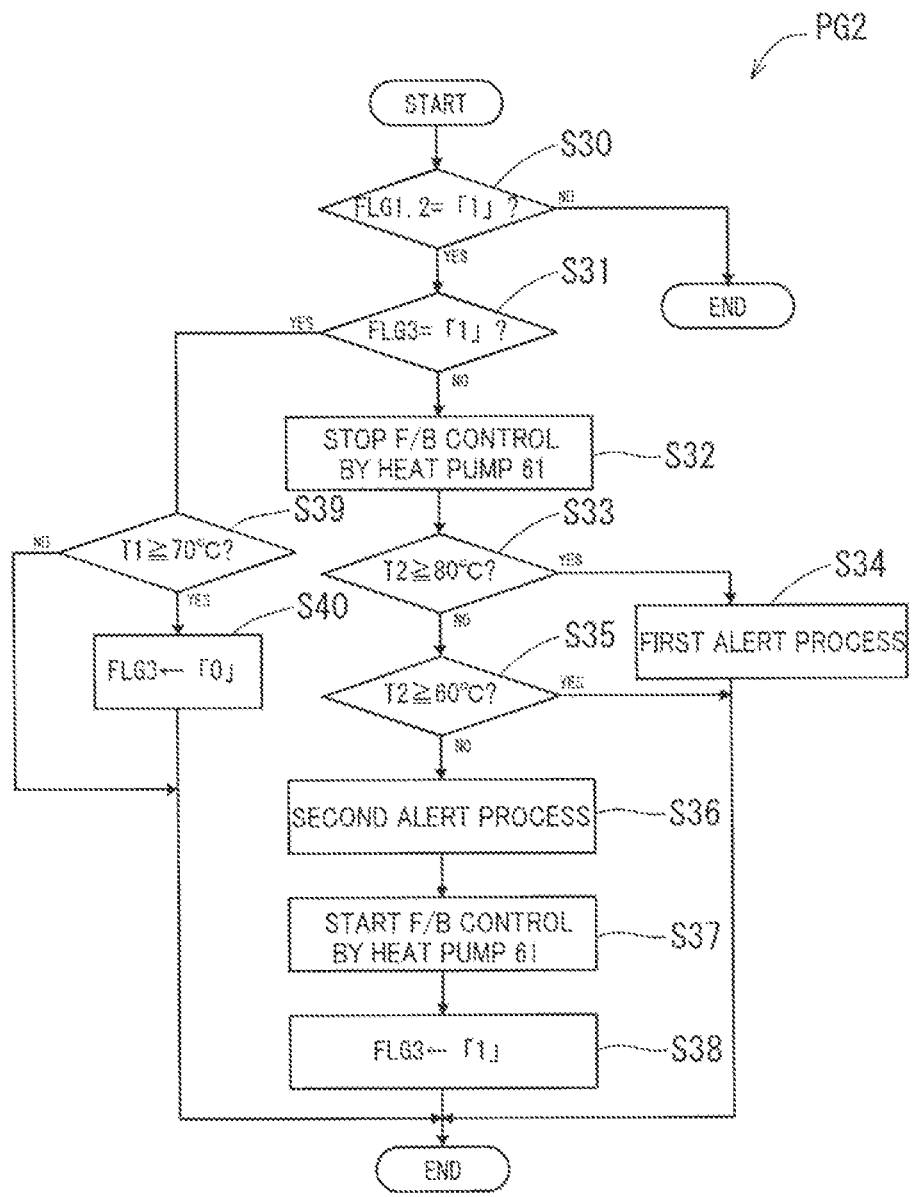
FIG. 3 is a flowchart of a switching control program.

As indicated in FIG. 3, in the switching control program PG2, firstly, whether or not FLG1 and FLG2 are both "1" is determined (S30). When neither FLG1 nor FLG2 is "1", control immediately exits the switching control program PG2 (NO in S30). When FLG1 and FLG2 are both "1" (YES in S30), whether or not FLG3 is "1" is determined (S31); when FLG3 is not "1" (NO in S31), the feedback control by the heat pump 61 of the warm-water bath 40 is stopped (S32). Then, whether or not the warm-water temperature T1 is 80° C. or more is determined (S33). When the warm-water temperature T1 is 80° C. or more (YES in S33), the first alert process is performed (S34) and control exits the switching control program PG2.

When the warm-water temperature T1 is not 80° C. or more (NO in S33), whether or not the warm-water temperature T1 is 60° C. or more is determined without performing an alert process (S35). When the warm-water temperature T1 is 60° C. or more (YES in S35), control immediately exits the switching control program PG2.

On the other hand, when the warm-water temperature T1 is less than 60° C. (NO in S35), a second alert process which is different from the first alert process is performed (S36). Then, the feedback control by the heat pump 61 of the warm-water bath 40 is again started (S37), and "1" is set on FLG3 (S38). Then, control exits the switching control program PG2.

Note that, the first alert process is performed by, for example, turning on a first alert lamp provided at the exhaust bypass duct 30. The second alert process is performed by, for example, turning on a second alert lamp, which is separate from the first alert lamp provided at the exhaust bypass duct 30. Furthermore, the turn-on of the first and second alert lamps is cancelled (turned off) by, for example, an operation on a reset button at the exhaust bypass duct 30.

When FLG3 is "1" as a result of the determining process of FLG3, whether or not the warm-water temperature T1 is 70° C. or more is determined (S39). When the warm-water temperature T1 is not 70° C. or more (NO in S39), control immediately exits the switching control program PG2. When the warm-water temperature T1 is 70° C. or more (YES in S39), FLG3 is reset to "0" (S40). Then, control exits the switching control program PG2.

While the temperature variation in the warm-water temperature T1 is maintained to be 60° C. or more by the switching control program PG2, out of the feedback control by the heat pump 61 and the ON/OFF control on the pump 44A, only the ON/OFF control on the pump 44A is exerted. When the warm-water temperature T1 once becomes less than 60° C., both the feedback control by the heat pump 61 and the ON/OFF control on the pump 44A are exerted until the temperature becomes 70° C. or more.

The foregoing is the description as to the structure of the electrodeposition coating system 10 according to the present embodiment. Next, a description will be given of the operation and effect of the electrodeposition coating system 10. The electrodeposition coating system 10 of the present embodiment is capable of heating the warm water in the warm-water bath 40 exploiting the heat of the air exhausted from the drying chamber 25, that is, waste heat, for suppressing VOC concentration in the drying chamber 25. Thus, the present embodiment achieves energy saving. Here, when the heating amount on the warm water by exploiting waste heat is excessive, the amplitude of the change in the warm-water temperature T1 becomes great. That is, the warm-water temperature T1 becomes unstable. On the other hand, an excessively small heating amount in waste-heat-exploiting heating causes the heat pump 61 to frequently drive. That is, the energy saving effect reduces. Addressing thereto, the electrodeposition coating system 10 according to the present embodiment outputs an alert when the heating amount in waste-heat-exploiting heating is excessively great and excessively small. Exerting control in an attempt of reducing the issuance of alert, the heating amount in waste-heat-exploiting heating can be adjusted.

Specifically, the flow rate of the air flowing through the exhaust bypass duct 30 for applying waste heat from the drying chamber 25 can be changed with the valves 29S, 30S (corresponding to "a first distribution-changing valve" in claims). Thus, adjustment of the heating amount in waste-heat-exploiting heating is attained. The heat-absorption-purpose warm-water circulation pipe 44 that receives the waste heat is provided with the warm-water bypass pipe 49 including the heatsink 46 downstream to the heat exchanger 48. The flow rate of warm water flowing through the warm-water bypass pipe 49 can be changed with the valves 44S, 49S (corresponding to "a second distribution-changing valve" in claims). Thus, adjustment of the heat dissipation amount of the warm water is attained. By virtue of provision of the cooling fan 47 that sends air toward the heatsink 46, the turning on/off the cooling fan 47 also realizes adjusting the heat dissipation amount of the warm water.

As has been described above, the heat recovery device 70 of the electrodeposition coating system 10 according to the present embodiment is capable of adjusting both of the heat application amount and the heat dissipation amount of the warm water heated by exploiting waste heat. That is, the amount of heat applied to the warm water of the warm-water bath 40 by waste heat can be adjusted more minutely than the conventional technique. This makes it possible to maintain the temperature of warm water for which waste heat is effectively exploited, contributing to increasing the energy saving effect. Accordingly, the electrodeposition coating system 10 according to the present embodiment reduces the costs in electrodeposition coating. When the heat amount of waste heat is insufficient, the heat pump 61 is used. This stabilizes the temperature of the warm water in the warm-water bath 40 and also the quality of the pre-process of electrodeposition coating. In the electrodeposition coating system 10, before the workpiece conveying device 11 and the heater 27C of the drying chamber 25 are actuated from the stopped state, the heat pump 61 of the warm-water bath 40 is started and the warm water in the warm-water bath 40 is heated until it reaches the previously set reference temperature (60° C.). Then, the workpiece conveying device 11 and others are actuated. This eliminates the wasteful latency that would occur when all the sites of the electrodeposition coating system 10 are actuated at once. This also contributes to improving energy saving.

Second Embodiment

The present embodiment is different from the electrodeposition coating system 10 according to the first embodiment only in control method. That is, in the electrodeposition coating system 10 according to the first embodiment, normally, by exerting only the ON/OFF control on the pump 44A of the warm-water circulation pipe 44 exploiting waste heat from the drying chamber 25, the temperature of warm water in the warm-water bath 40 is controlled to be maintained at the set temperature (70° C.). The feedback control by the heat pump 61 is exerted only when the heat amount by waste heat is insufficient. Here, according to the present embodiment, it is deliberately set so that the heat amount by waste heat becomes slightly insufficient. Then, the opening of the valves 29S, 30S, 44S, 49S is set to supplement the heat amount by the heat of the heat pump 61. Thus, the temperature in the warm-water bath 40 is controlled to be maintained at the set temperature. By virtue of provision of the heat recovery device 70, this structure is also capable of adjusting the heat amount applied to warm water of the warm-water bath 40 by waste heat more minutely than the conventional technique. This makes it possible to maintain the temperature of warm water for which waste heat is effectively exploited and contributes to increasing the energy saving effect.

Other Embodiment (1) In the heat recovery device 70 of the above-described embodiment, while waste heat is exploited between the drying chamber 25 and the warm-water bath 40 included in the electrodeposition coating system 10, waste heat may be exploited between two facilities included in a system other than the electrodeposition coating system or two facilities respectively forming separate systems or manufacturing lines.

(2) While the valves 29S, 30S, 44S, 49S according to the above-described embodiment are capable of changing the flow rate, the valve may not be able to adjust the flow rate and may simply function to switch between the open state and the closed state. The valves 29S, 44S of the exhaust duct 29 and the warm-water circulation pipe 44 may be dispensed with and only the valve 30S of the exhaust bypass duct 30 and the valve 49S of the warm-water bypass pipe 49 may be included. Furthermore, a three-way valve may be provided at each of the shared connection part of the exhaust bypass duct 30 and the exhaust duct 29 and the shared connection part of the warm-water circulation pipe 44 and the warm-water bypass pipe 49.

(3) In the first embodiment, while the warm-water bypass pipe 49 communicates between two points in the warm-water circulation pipe 44, one end of the warm-water bypass pipe 49 may communicate with the warm-water circulation pipe 44 and the other end of the warm-water bypass pipe 49 may communicate with the warm-water bath 40.

REFERENCE SIGNS LIST 10 electrodeposition coating system
11 workpiece conveying device
21 degreasing bath (liquid bath)
21T, 22T, 23T, 24T, 25T, 40T temperature sensor
22 cleaning bath (liquid bath)
23 chemical treatment bath (liquid bath)
24 electrodeposition bath
25 drying chamber
27C heater (second heater)
29 exhaust duct
29S, 30S valve (first distribution-changing valve)
44S, 49S valve (second distribution-changing valve)
30 exhaust bypass duct
31 control unit
40 warm-water bath
41, 44 warm-water circulation pipe
46 heatsink
47 cooling fan
45, 48 heat exchanger
49 warm-water bypass pipe
61 heat pump (first heater)
70 heat recovery device
90 workpiece
PG1 actuation control program
PG2 switching control program

The invention claimed is:

1. A heat recovery device configured to an electrodeposition coating system, the heat recovery device comprising:
 a first heater configured to heat a warm-water bath configured to store warm water;
 a second heater configured to heat an inside of a drying chamber, wherein heat of air exhausted from the drying chamber to outside air heats the warm water in the warm-water bath
 an exhaust duct through which the air exhausted from the drying chamber to the outside air passes;
 an exhaust bypass duct communicating between two positions in the exhaust duct;
 a warm-water circulation pipe through which the warm water of the warm-water bath circulates;
 a heat exchanger provided at a midway portion of the warm-water circulation pipe so as to cause heat of the air in the exhaust bypass duct to be absorbed by the warm water in the warm-water circulation pipe;
 a warm-water bypass pipe communicating between two positions downstream to the heat exchanger in the warm-water circulation pipe or between one position downstream to the heat exchanger in the warm-water circulation pipe and the warm-water bath;
 a heatsink provided at the warm-water bypass pipe;
 a first distribution-changing valve configured to change distribution of air flowing from the exhaust duct to the exhaust bypass duct; and
 a second distribution-changing valve configured to change distribution of water flowing from the warm-water circulation pipe to the warm-water bypass pipe.

2. The heat recovery device according to claim 1, further comprising a cooling fan configured to send air to the heatsink.

3. The heat recovery device according to claim 2, further comprising:
 a temperature sensor configured to detect a temperature of the warm-water bath; and
 a control unit configured to control a heat application amount by the first heater so that a detection result from the temperature sensor attains a previously determined set temperature.

4. An electrodeposition coating system comprising:
 the heat recovery device according to claim 3;
 an electrodeposition bath configured to store a liquid for electrodeposition coating;
 a plurality of liquid baths configured to store liquids for pre-processes of the electrodeposition coating;
 a plurality of liquid circulation pipes through which the liquids in the plurality of liquid baths circulate;
 a plurality of heating-purpose warm-water circulation pipes through which the warm water of the warm-water bath circulates;
 a plurality of heat exchangers configured to exchange heat between the plurality of liquid circulation pipes and the plurality of heating-purpose warm-water circulation pipes; and
 a workpiece conveying device configured to convey workpieces to the liquid baths, the electrodeposition bath, and the drying chamber.

5. The electrodeposition coating system according to claim 4, wherein the control unit is configured to, before the workpiece conveying device and the second heater are actuated from a stopped state, actuate the first heater to heat the warm water in the warm-water bath until the warm water attains a previously determined reference temperature.

6. The heat recovery device according to claim 1, further comprising:
 a temperature sensor configured to detect a temperature of the warm-water bath; and
 a control unit configured to control a heat application amount by the first heater so that a detection result from the temperature sensor attains a previously determined set temperature.

7. An electrodeposition coating system comprising:
 the heat recovery device according to claim 6;
 an electrodeposition bath configured to store a liquid for electrodeposition coating;
 a plurality of liquid baths configured to store liquids for pre-processes of the electrodeposition coating;
 a plurality of liquid circulation pipes through which the liquids in the plurality of liquid baths circulate;
 a plurality of heating-purpose warm-water circulation pipes through which the warm water of the warm-water bath circulates;
 a plurality of heat exchangers configured to exchange heat between the plurality of liquid circulation pipes and the plurality of heating-purpose warm-water circulation pipes; and
 a workpiece conveying device configured to convey workpieces to the liquid baths, the electrodeposition bath, and the drying chamber.

8. The electrodeposition coating system according to claim 7, wherein the control unit is configured to, before the workpiece conveying device and the second heater are actuated from a stopped state, actuate the first heater to heat the warm water in the warm-water bath until the warm water attains a previously determined reference temperature.

* * * * *